US010055713B2

(12) United States Patent
Quentin

(10) Patent No.: US 10,055,713 B2
(45) Date of Patent: Aug. 21, 2018

(54) METHOD FOR DELEGATING AN IMPLEMENTATION OF TRANSACTIONS, CORRESPONDING DEVICES AND PROGRAMS

(71) Applicant: Ingenico Group, Paris (FR)

(72) Inventor: Pierre Quentin, Enghien les Bains (FR)

(73) Assignee: Ingenico Group, Paris (FR)

( * ) Notice: Subject to any disclaimer, the term of this patent is extended or adjusted under 35 U.S.C. 154(b) by 443 days.

(21) Appl. No.: 14/724,091

(22) Filed: May 28, 2015

(65) Prior Publication Data

US 2015/0347988 A1    Dec. 3, 2015

(30) Foreign Application Priority Data

May 28, 2014  (FR) ...................... 14 54880

(51) Int. Cl.
| | |
|---|---|
| *G06Q 20/40* | (2012.01) |
| *G06Q 40/00* | (2012.01) |
| *G06Q 20/02* | (2012.01) |
| *G06Q 20/10* | (2012.01) |
| *G06Q 20/38* | (2012.01) |
| *G06Q 20/08* | (2012.01) |
| *G06Q 20/22* | (2012.01) |

(52) U.S. Cl.
CPC ......... *G06Q 20/02* (2013.01); *G06Q 20/0855* (2013.01); *G06Q 20/10* (2013.01); *G06Q 20/227* (2013.01); *G06Q 20/382* (2013.01); *G06Q 20/405* (2013.01); *G06Q 20/4012* (2013.01)

(58) Field of Classification Search
CPC .............................. G06Q 20/40; G06Q 40/00

USPC ...................................................... 705/39, 44
See application file for complete search history.

(56) References Cited

U.S. PATENT DOCUMENTS

| | | | |
|---|---|---|---|
| 2005/0015332 A1 | 1/2005 | Chen | |
| 2012/0150748 A1* | 6/2012 | Law ...................... | G06Q 20/20 705/71 |

(Continued)

FOREIGN PATENT DOCUMENTS

FR    2789785 A1    8/2000

OTHER PUBLICATIONS

French Preliminary Search Report and Written Opinion dated Oct. 10, 2014 for French Application No. 1454880, filed May 28, 2014.

(Continued)

*Primary Examiner* — Sara C Hamilton
(74) *Attorney, Agent, or Firm* — David D. Brush; Westman, Champlin & Koehler, PA

(57) ABSTRACT

A method and device are provided for delegating an implementation of transactions to an intermediate user. The method includes: at least one first phase of registering at least one payment server with the intermediate server, the first phase delivering, within the intermediate server, a delegating data structure including at least one association between the payment server and at least one list of types of transactions delegated by the payment server to the intermediate server; and at least one second phase of registering at least one user with the intermediate server, the second phase delivering, within the intermediate server, a provisioning data structure including at least one association between a user identifier, a payment server identifier and a user identifier with the payment server.

10 Claims, 4 Drawing Sheets

(56) References Cited

U.S. PATENT DOCUMENTS

2014/0379561 A1* 12/2014 Amancherla ...... G06Q 20/4016
　　　　　　　　　　　　　　　　　　　　　705/39
2015/0046327 A1*　2/2015　Taupitz ................ G06Q 20/227
　　　　　　　　　　　　　　　　　　　　　705/44

OTHER PUBLICATIONS

English translation of the Written Opinion dated Oct. 10, 2014 for French Application No. 1454880, filed May 28, 2014.

* cited by examiner

METHOD FOR DELEGATING AN IMPLEMENTATION OF TRANSACTIONS, CORRESPONDING DEVICES AND PROGRAMS

1. CROSS-REFERENCE TO RELATED APPLICATIONS

This Application claims the benefit of and priority to French Patent Application No. 14 54880, filed May 28, 2014, the content of which is incorporated herein by reference in its entirety.

2. FIELD OF THE DISCLOSURE

The present disclosure relates to the field of transactions, especially financial transactions, performed by a user by means of a communications terminal. It is aimed more particularly at simplifying the use of a third-party service for implementing these transactions.

3. PRIOR ART

The major development of communications networks and the commercial distribution of increasingly high-performing connected mobile terminals at increasingly affordable costs has meant that general consumers now have almost permanent access to the Internet. Whether it is through WiFi networks or through the latest-generation mobile telephony networks using smartphones, tablets or laptops, everybody can now access personal information or general information at any time and place.

These developments have led to the emergence of novel services enabling a user to make transactions, especially financial transactions, such as operations of payment for a purchase or for transferring funds between accounts, directly from his mobile terminal. Examples that can be cited are services such as Paypal™ or Flashiz™ in the field of online payment or again services developed by banking institutions for their customers. While a certain number of functions offered by these services are common to all, each of them nevertheless has its specific features. Thus, a service such as Flashiz™ enables a purchase to be made speedily and simply by flashing a QR-code type barcode with a mobile device. The success of Paypal™, a pioneering service in this field, enabling purchases to be made without having to enter bank details, has placed it in the position of widely generally recognized payment means that is proposed and accepted by the users of online classified ads. Finally, banking institutions, as holders of a customer's account or accounts, offer specific functions such as the issuing of bank identification details or the transfer of money from a current account towards a savings account.

Since each service has its own special features, a user can subscribe to several of them to meet a multitude of needs. For example, a user would classically install the following applications on his mobile terminal: his banking institution's own application in order to manage his accounts, an application enabling him to make a purchase by simply scanning a product barcode and finally a Paypal™ type application offering him a simple means to make purchases on a classified advertisement site for example.

To be able to carry out the transactions for which they have been designed, all these applications need to be attached to a bank account of the user. This can be done for example through the furnishing, by the user, of the data associated with a bankcard to a payment service provider.

It goes without saying that it is essential to secure the access to these services: a user who has misplaced or been robbed of his mobile device (his portable telephone for example) must have the guarantee that a malicious person who recovers his article will not be able to access his bank information or services enabling the performance of financial transactions in his name.

Thus, the use of these services requires a preliminary step of authentication of the user. Although other means exist and are tending to develop (for example biometric identification means), this step is most often implemented by means of a request to the user to enter an identifier and a password normally known to him alone. This identifier and password will have been preliminarily defined during the subscription to the service by the user.

Since each service is free to fix its own rules as regards the identifier's format and the password, it is very probable that a user who has subscribed to several services of this type will have several identifiers and/or associated passwords to memorize. Thus, memorizing login information or login details that vary from one service to another can soon prove to be a painstaking task for the user.

To cope with these problems, there are services acting as intermediaries. These services, using an application installed in the user's communications terminal, enable the pooling, within a same interface, of information coming from different third-party services to which the user has subscribed. Thus, through this unique entry point, the user can access data from numerous services with which he has previously registered via the application without having to enter the identifiers and passwords proper to each third-party service thus attached at each time of use.

This approach however has drawbacks for the user. The sensitive login details for the different services holding his data is disclosed to an intermediate service with all the risks that this entails. An example that can be cited is the risk that the infrastructure of the intermediate service might be hacked, enabling malicious persons to retrieve a multitude of login details belonging to the user, or again the risk of misuse of trust on the part of the intermediate service which has been granted total access to the data without any means of limiting the scope of this access.

Implementing the oAuth protocol between the intermediate services and the service holding the user's data is one means of overcoming the above-mentioned drawbacks. It indeed enables the intermediate service to obtain authorization to access the user's data without any communication of details for logging into the third-party service holding this data. However, one of the weak points regularly put forward with this protocol is that it favors precisely the type of interaction implemented by malicious persons during phishing attempts, namely a redirection of the user towards a third-party interface for entering his details for logging into a service.

There therefore exists a need for a method that enables an intermediate server to carry out transactions on behalf of a payment server and does not have at least some of the drawbacks explained here above.

4. SUMMARY

An exemplary embodiment of the present disclosure relates to a method for delegating an implementation of transactions to an intermediate user. The method comprises:
at least one first phase for registering at least one payment server with said intermediate server, said first phase delivering, within said intermediate server, a delegating data structure comprising at least one association between said payment server and at least one list of types of transactions delegated by said payment server to said intermediate server; and at least one second phase for registering at least one user with said intermediate server, said second phase delivering, within said intermediate server, a provisioning data structure comprising at least one association between a user identifier, a payment server identifier and a user identifier with said payment server.

Thus, the intermediate server is capable of associating, within itself, payment servers, types of delegated transactions and users identified with the different payment servers.

According to one particular embodiment, said first phase of the method comprises:

a step for transmitting a request to said payment server for delegating types of transactions, said request comprising a list of types of delegatable transactions, which the intermediate server wishes to implement on behalf of said payment server;

a step for receiving a piece of data representing a decision on subscription by the payment server to at least one type of transaction of the list of types of delegatable transactions, called a list of types of delegated transactions;

a step for the recording, within said delegating data structure, of an association between said list of types of delegated transactions and the payment server.

Thus, the intermediate server can execute or implement transactions on behalf of a payment server. These transactions are listed in the list of types of delegated transactions that is transmitted by the payment server. This payment server therefore keeps its discretionary power to attribute a delegation as a function of the intermediate servers with which it deals. The payment server thus complementarily has a means available to lightening its data-processing load since it can rely, so to speak on proximity servers to carry out certain types of transaction.

According to one particular embodiment, said first phase of the method furthermore comprises:

a step for receiving a list of types of transactions implemented by the payment server called a list of types of non-delegated transactions;

a step for the recording, within the delegating data structure, of an association between said list of types of non-delegated transaction and the payment server.

Thus, the intermediate server can differentiate the transactions that it cannot itself carry out. Thus, the intermediate server can differentiate the transactions that it can implement itself from those that it cannot implement itself and that it must relay to the payment server. The payment server can therefore agree or refuse to delegate the performance of certain types of transactions to the intermediate server.

According to one particular embodiment, said second phase of the method comprises:

a step for receiving a registration request by a user, coming from a communications terminal, said request comprising at least one identifier of said user, at least one identifier of a payment server and at least one identifier of said user with said payment server;

a step for transmitting said user identifier with said payment server to said payment server;

a step for receiving a piece of data representing a decision to register said user; and when said data representing a decision to register the user is positive, a step for recording, within said provisioning data structure, an association between said user identifier, said payment server identifier and said user identifier with said payment server.

Thus, the users and the payment service providers are registered within one and the same intermediate server capable of implementing a list of predetermined transactions. This means that from the user's viewpoint, the execution of transactions is simplified.

According to one particular embodiment, said second phase of the method furthermore comprises:

a step for transmitting a request to delegate types of transactions to said communications terminal, said request comprising a list of types of delegatable transactions, that the intermediate server wishes to implement;

a step for receiving, from said communications terminal, a piece of data representing a decision of subscription by said user to at least one type of transaction of the list of types of delegatable transactions, called list of types of delegated transactions;

a step for recording, within the delegating data structure, an association between said list of types of delegated transactions and said user.

Thus, the user remains in full control the acceptance or non-acceptance of the delegation of a type of transaction to the intermediate server, including types of transactions delegated by a payment server to the intermediate server.

In another embodiment, the disclosure also relates to a method for the processing, by an intermediate server, of a transaction coming from a user's telecommunications terminal. According to an exemplary embodiment, such a processing method comprises:

a step for receiving a request for executing a transaction;

a step for obtaining, from said request, at least one identifier of said user, at least one identifier of a payment server and at least one type of said transaction;

a step for searching, within a provisioning data structure, for an identifier of said user with the payment server;

a step for searching, within a delegating data structure, for a piece of delegating data associated with said type of said transaction, delivering a decision to delegate;

when said decision to delegate is positive, a step for the implementing, by said intermediate server, of said transaction;

when said decision to delegate is negative, a step for transmitting said type of transaction and said user identifier with said payment server to said payment server.

Thus, it is possible to carry out a transaction directly from an intermediate server.

According to one particular embodiment, said method for processing is characterized in that when said decision to delegate is positive, said step for implementing said transaction comprises:

a step for setting up, with the payment server, a secured link for transmitting data;

a step for transmitting a request, to the payment server, for obtaining a piece of bank data, said request comprising said identifier of said user with said payment server;

a step for receiving said piece of banking data associated with said user;

a step for executing said transaction by means of said piece of bank data.

Thus, the intermediate server, through its secured link with the payment server, is capable of obtaining complementary information needed for implementing the transaction. This information is not saved by the intermediate server. Thus, even when the intermediate server is compromised, the theft of data present in this intermediate server will not enable the transaction to be performed.

According to one particular characteristic, when said decision to delegate is negative, said method for processing further comprises a step for receiving a status of implementation of said transaction from the payment server.

Thus, the intermediate server knows the status of a transaction made by the payment server. It is especially informed of the end of a transaction.

According to another particular characteristic, said method for processing further comprises a step for transmitting a status of implementation of said transaction to said user's communications terminal.

Thus, the intermediate server is capable of alerting a user about the status of a transaction, especially the fact that it has been properly executed.

According to one particular embodiment, the communications channel between the intermediate server and the payment server is secured.

According to one particular embodiment, the communications channel between the intermediate server and the communications terminal is secured.

Thus, the entire communications line is secured. Thus, the intermediate server, through its secured link with the communications terminal, is capable of obtaining information needed for implementing the transaction. Only this identifier is saved by the intermediate server. Thus, even when the intermediate server is compromised, the theft of data presented by this intermediate server does not enable the transaction to be performed.

In another embodiment, the disclosure also relates to an intermediate server for delegating the implementation of transactions according to the method of delegation explained here above. According to an exemplary embodiment, such an intermediate server comprises:
- means for registering at least one payment server with said intermediate server, said means delivering, within said intermediate server, a delegating data structure comprising at least one association between said payment server and at least one list of types of transactions delegated by said payment server to said intermediate server; and
- means for registering at least one user with said intermediate server, said means delivering, within said intermediate server, a provisioning data structure comprising at least one association between a user identifier, a payment server identifier, and a user identifier with said payment server.

According to an implementation, the different steps of the methods according to the disclosure are implemented by one or more software programs or computer programs comprising software instructions to be executed by a data processor of a relay module according to the disclosure and being designed to command the execution of the different steps of the methods.

Consequently, the disclosure also relates to a program capable of being executed by a computer or a data processor, this program comprising instructions to command the execution of the steps of a method as mentioned here above.

This program can use any programming language whatsoever and can be in the form of a source code, object code or an intermediate code between source code and object code as in a partially compiled form, or in any other desirable form.

The disclosure is also aimed at providing an information carrier readable by a data processor and comprising instructions of a program as mentioned here above.

The information carrier can be any entity or device capable of storing the program. For example, the carrier can comprise a storage means such as a ROM, for example a CD ROM or a microelectronic circuit ROM or again a means of magnetic recording, for example a floppy disk or a hard disk drive.

Besides, the information carrier can be a transmissible carrier such as an electrical or optical signal, which can be conveyed via an electrical or optical cable, by radio or by other means. The program according to an exemplary embodiment can especially be downloaded from an Internet type network.

As an alternative, the information carrier can be an integrated circuit in which the program is incorporated, the circuit being adapted to executing or to being used in the execution of the method in question.

According to one embodiment, the disclosure is implemented by means of software and/or hardware components. In this respect, the term "module" in this document can correspond equally well to a software component as to a hardware component or to a set of hardware or software components.

A software component corresponds to one or more computer programs or several sub-programs of a program or more generally to any element of a program or a software package capable of implementing a function or a set of functions, according to what is described here above for the module concerned. Such a software component is executed by a data processor of a physical entity (terminal, server, gateway, router, etc) and is capable of accessing hardware resources of this physical entity (memory, recording media, communications buses, input/output electronic boards, user interfaces, etc).

In the same way, a hardware component corresponds to any element of a hardware assembly capable of implementing a function or a set of functions according to what is described here below for the module concerned. It may be a programmable hardware component or a component with an integrated processor for the execution of the software, for example an integrated circuit, a smartcard, a memory card, an electronic card for executing firmware, etc.

Each component of the system described here above naturally implements its own software modules.

The different embodiments mentioned here above can be combined with one another to implement one or more aspects of the present disclosure.

5. LIST OF FIGURES

Other features and advantages shall appear more clearly from the following description of several embodiments, given by way of simple, illustrative and non-exhaustive examples, and from the appended figures, of which:

FIG. 1 describes an embodiment having a phase for registering a payment server with an intermediate server;

FIG. 2 describes a complementary embodiment having a phase for registering a user with an intermediate server;

5. DESCRIPTION OF ONE EMBODIMENT

5.1 General Principle

As explained here above, it has been observed that the present-day solutions enabling the intermediate service to carry out the transaction on behalf of a payment service can expose a user to certain risks: hacking of data at the intermediate service, an excessively high level of privilege granted to the intermediate service, increased risk of phishing. The use of an intermediate service to pool payment services however is of interest to the user since this solution releases him from the need to memorize and repeatedly enter a multitude of login details. An exemplary object of the proposed method therefore is to enable a user to associate a payment service to which he has preliminarily subscribed with an intermediate service so that the latter can carry out transactions on behalf of the former without showing at least some of the drawbacks explained here above and without changing the user's customary habits when using this type of service. It is therefore a method for delegating the implementing of transactions to an intermediate server. This delegation is not systematic: for various reasons: for example, for complex transactions, transactions that bring into play large amounts or for any other reason, the payment server should be able to retain total control over certain types of transactions.

The general principle of an exemplary embodiment relies on the implementing of two registration phases in relation with an intermediate server: a first phase for registering at least one payment server with the intermediate server and a second phase for registering at least one user with the intermediate server.

The phase for registering at least one payment server with an intermediate server enables the constitution, within the intermediate server, of a data structure called a delegating data structure comprising at least one association between said payment server (SrvP) and at least one list of types of delegated transactions delegated (LTDe) by said payment server (SrvP) to said intermediate server (SrvInt). Thus, the intermediate server knows, with regard to a given payment server, the types of transaction that are delegated to it by this payment server.

The phase for registering at least one user with the intermediate server, for its part, enables the constitution, within the intermediate server, of a data structure called a provisioning data structure comprising at least one association between a user identifier (id), a payment server identifier (idSrvP) and a user identifier (idP) with said payment server (SrvP). Thus, the intermediate server knows the payment servers associated with a given user and the identifiers of this user with these payment servers.

Here below, we present an implementation of the principle explained here above. This implementation is in no way exhaustive and any other implementation comprising the same characteristics as those explained can be envisaged.

5.2 Description of One Embodiment

Figure 1:
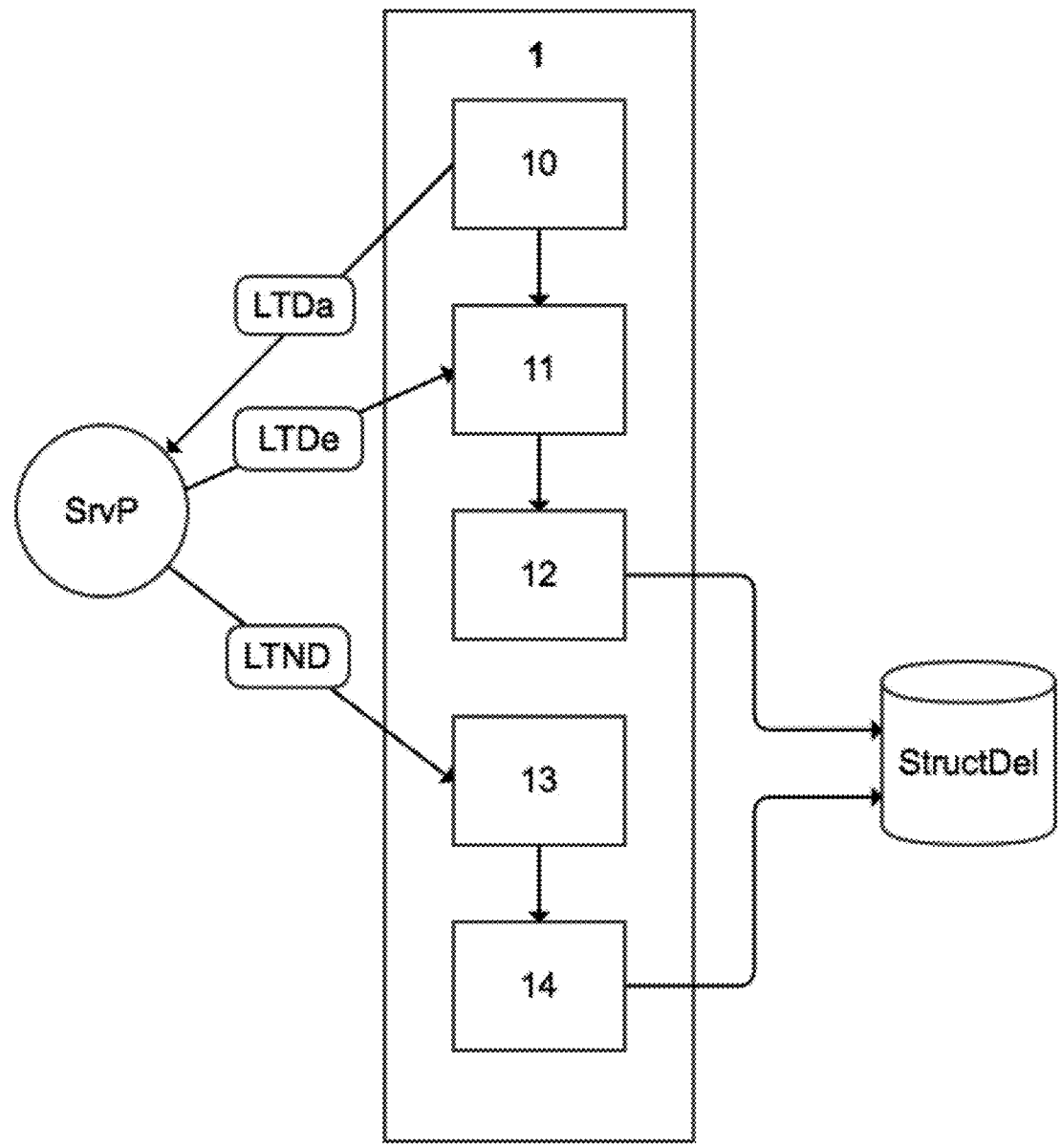
Figure 2:
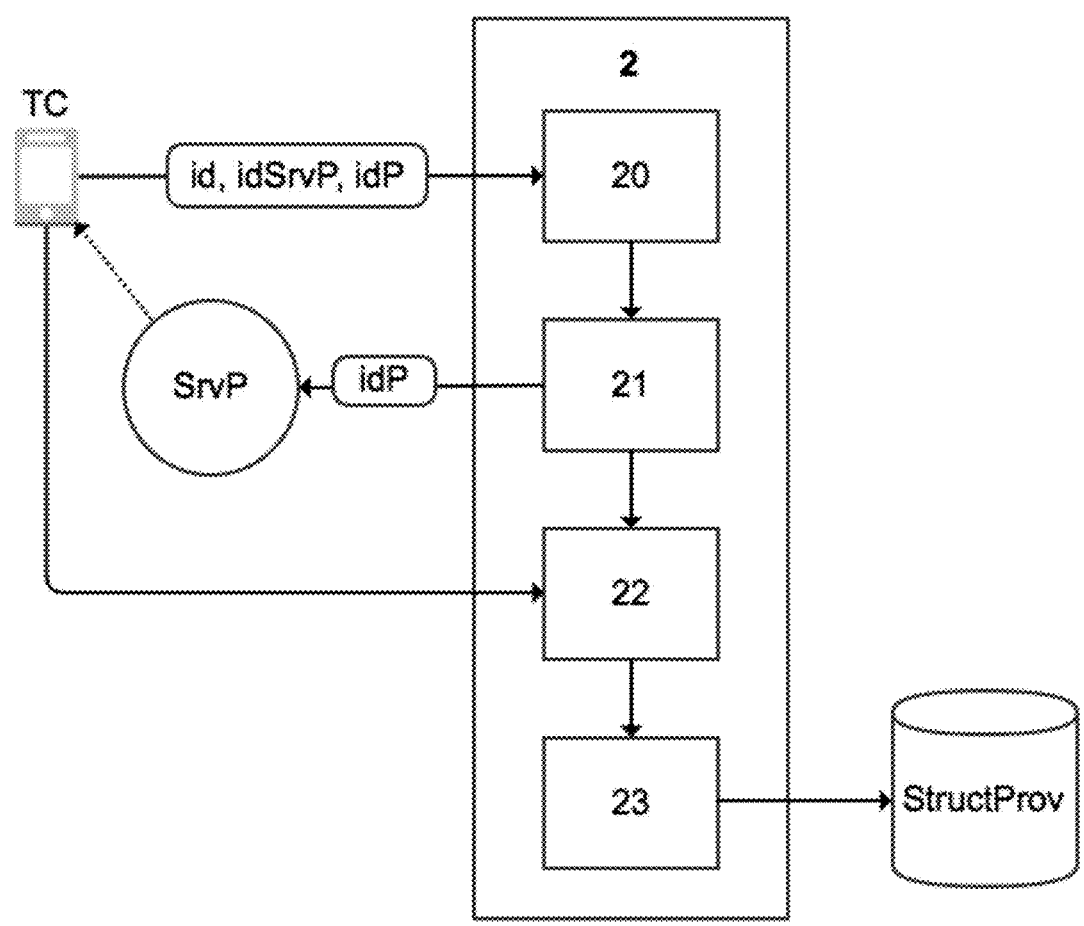

In this embodiment presented with reference to FIGS. 1 and 2, in a first phase (1), a payment server is registered with an intermediate server. Then, in a second phase (2), a user is registered with the intermediate server according to the general principle of an exemplary embodiment described here above.

In this embodiment, the first phase (1) of the method for delegating implemented comprises, with reference to FIG. 1:
 a step for transmitting (10), to a payment server (SrvP), a request for delegating types of transactions, said request comprising a list of types of delegatable transactions (LTDa), that the intermediate server (SrvInt) wishes to implement on behalf of said payment server (SrvP);
 a step for receiving (11) a piece of data representing a decision on subscription by the payment server (SrvP) to at least one type of transaction of the list of types of delegatable transactions (LTDa) called list of types of delegated transitions (LTDe);
 a step for registering (12), within said delegating data structure (StructDel), an association between said list of types of delegated transactions (LTDe) and the payment server (SrvP).

In the particular embodiment explained with reference to FIG. 1, this first phase (1) furthermore comprises:
 a step for receiving (13) a list of types of transactions implemented by the payment server (SrvP) called a list of types of non-delegated transactions (LTND);
 a step for registering (14), within the delegating data structure (StructDel), an association between said list of types of non-delegated transactions (LTND) and the payment server (SrvP).

In other embodiments, this first phase (1) can comprise only one or the other of the sequences of steps (10) to (12) on the one hand, or (13) to (14) on the other hand.

This first phase (1) for registering a payment server with an intermediate server makes it possible to set up a relation of trust between these two servers and to fix the perimeter of action of each of them, this perimeter of action being defined by the associations recorded in the delegating data structure. The intermediate server therefore submits a list of types of transactions, called delegatable transactions, to the payment server. These are transactions that it proposes to carry out itself on behalf of the payment server. The payment server for its part informs the intermediate server of the types of transactions that must remain in its perimeter and that it does not wish to delegate. Thus, at the end of this first phase and before any action by the user of the intermediate service, the intermediate server and the payment server are identified with respect to each other and the intermediate server knows to differentiate the types of transactions that it can perform by itself from those that it must relay to the payment server. Through this mechanism, the intermediate server can execute or implement a transaction on behalf of the payment server. The delegation or non-delegation of types of transaction remains the responsibility of the payment server which therefore keeps its discretionary power to assign delegations as a function of the intermediate servers with which it deals. The payment server thus, in a complementary way, has a means available to lighten its data-processing load since it can so to speak rely on proximity servers to carry out certain types of transaction. The types of delegated transactions can for example relate to types of transactions deemed to be of low complexity or again transactions which, in the case of financial transactions, involve fairly small amounts (for example smaller than an amount recorded in the delegation settings). On the contrary, the type of non-delegated transaction for which the payment server wishes to keep control over execution, may relate to more complex operations or more sensitive operations for a user, for example financial transactions involving large amounts. These examples are naturally given purely by way of an illustration and are therefore not exhaustive.

To this first phase (1) for registering a payment server with an intermediate server, a second phase (2) is added for registering a user with the intermediate server. This user has preliminarily subscribed to services proposed by said payment server and therefore has available identifier and password type details to login with this server.

In this second phase (2), the following steps are implemented with reference to FIG. 2:

a step for receiving (20) a request for registering a user, coming from a communications terminal (TC), said request comprising at least one identifier of said user (id), at least one identifier of a payment server (idSrvP) and at least one identifier of said user (idP) with said payment server (SrvP);

a step for transmitting (21), to said payment server (SrvP), said user identifier (idP) with said payment server (SrvP);

a step for receiving (22) a piece of data representing a decision on registration of said user (Usr); and when said piece of data representing a decision on registration of the user is positive, a step for registering (23), within said provisioning data structure (StructProv), an association between said user identifier (id), said payment server identifier (idSrvP) and said user identifier (idP) with said payment server (SrvP).

The provisioning data structure thus constituted at the level of the intermediate server enables it, for a given user, to know the payment services that this user has chosen to pool within this intermediate server and, for each of them, its user identifier with this service. This second phase (2) for registering a user with the intermediate server furthermore makes it possible to set up a relationship of trust between the user and the intermediate server, a relationship that is assumed to be secured through the use of a secured means of transition between the terminal of the user and the intermediate server. Thus, once a payment server is registered in the intermediate server, a user having an account with this payment server can then attach it to the intermediate server by carrying out an appropriate registration. In one embodiment, the user is identified with the intermediate server by the use of an identifier/password pair. In a preferred embodiment, either the user is identified by the user of cryptographic equipment installed both on the user's communications terminal and on the intermediate server, or by other means. This embodiment has several advantages. First of all, it enables the user to attach the account that he holds with the payment server to the intermediate server in providing, during the registration with the intermediate server, only his user identifier with this payment server. The communication of the associated password is no longer necessary since a relationship of trust is preliminarily set up between the intermediate server and the payment server. This results in a simplification of the entry, as compared with the prior-art solutions, for the user wishing to attach a payment account to an intermediate server. Secondly, a malicious intrusion of the intermediate server into the system will not compromise the payment servers attached by the user since the passwords of the associated accounts are not known to the intermediate server.

In another particular embodiment, the user has the possibility of refusing to let the intermediate server carry out certain types of transactions on behalf of the payment server, and of doing so even if the payment server has preliminarily authorized the delegation of said types of transactions to the intermediate server during the first phase of registration. In this case, the user's decision has priority and the concerned transactions are carried out by the payment server.

Thus, as compared with the previous embodiment, the second phase (2 for registering a user with the intermediate service will furthermore comprise:

a step for transmitting a request for delegation of the types of transactions to said communications terminal (TC), said request comprising a list of types of delegatable transactions (LTDaUsr), that the intermediate server (SrvInt) wishes to implement;

a step for receiving a piece of data coming from said communications terminal (TC), this piece of data representing a decision of subscription by said user (Usr), to at least one type of transaction of the list of types of delegatable transactions (LTDaUsr), called a list of types of delegated transactions (LTDeUsr);

a step for registering an association, within the delegating data structure (StructDel), between said list of types of delegated transactions (LTDeUsr) and said user (Usr).

In this embodiment, the delegation structure constituted during the first phase (1) for registering a payment server with an intermediate server is therefore enriched by the addition of associations between a user and the types of transactions for which this user effectively authorizes the delegation, namely the implementing of a transaction by the intermediate server. The types of transactions that can be concerned by this mechanism are only those that the payment server has chosen to delegate to the intermediate server in the first phase. Thus, a user is not able to impose a delegation of a type of transaction to the intermediate server if the type of transaction concerned is not part of the list of types of transactions delegatable (LTDe) to the intermediate server by the payment server.

5.3 Use and Associated Embodiments

Once the registrations have been made with the intermediate server, firstly of a payment server (according to the first phase of the method for delegating) and secondly of a user having available an account on this payment server (according to the second phase of the method for delegating), the delegation mechanism can be used to process a transaction. Thus, the user can request the execution of a transaction from a communications terminal in his possession, by means of said intermediate server. This communications terminal can for example be a smartphone, a tablet, a desktop computer or laptop. The service associated with this intermediate server can be accessible for example by means of a dedicated application installed in the user's communications terminal, or again it can be an Internet site that can be consulted directly from a browser present in the communications terminal. The use of this service can require a preliminary entry of a login detail for logging in to the server such as the identifier/password pair or again a personal identification number (PIN) code or it can require the use any other means of authentication including biometric means.

Figure 3:
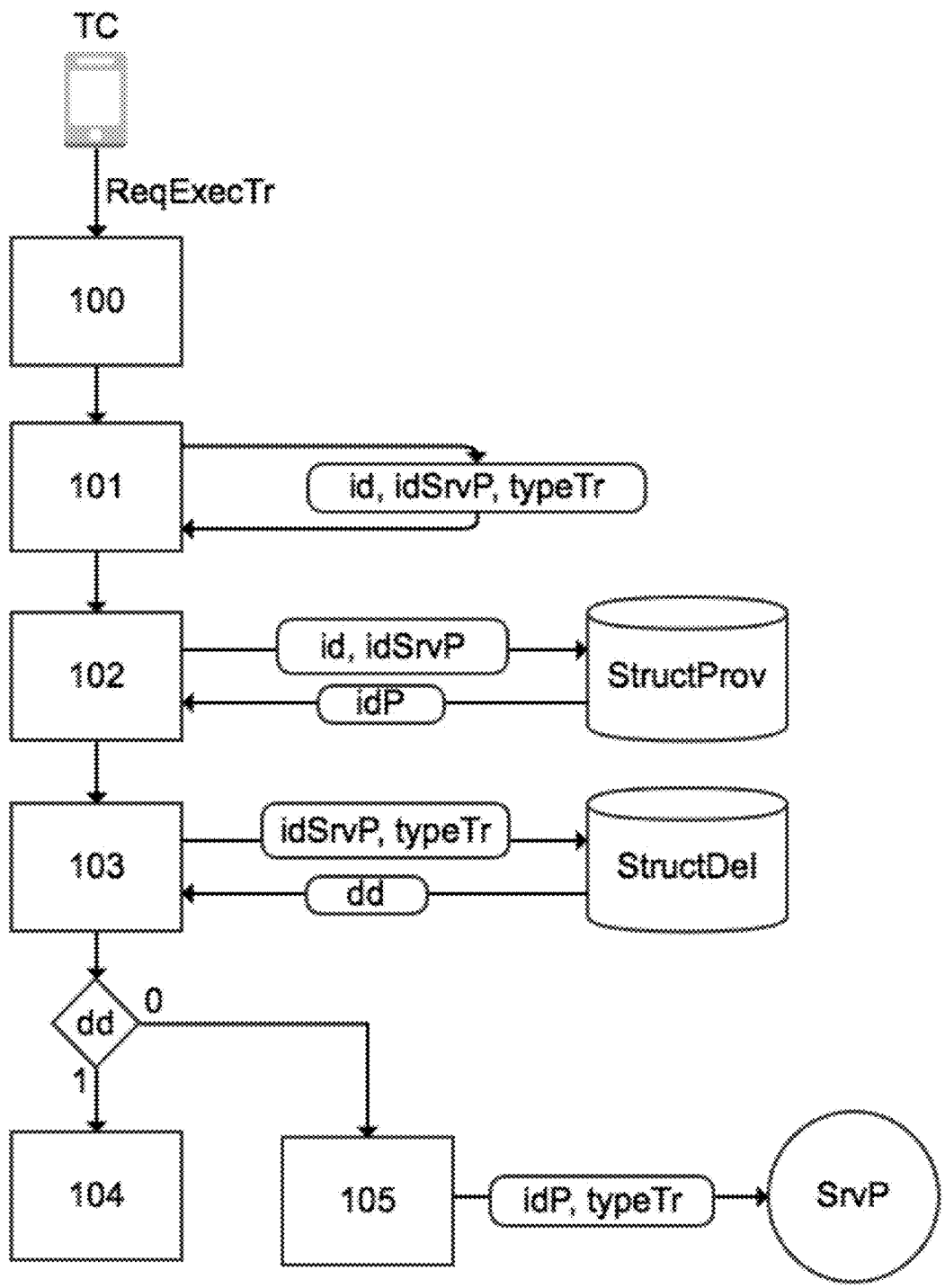
FIG. 3 illustrates an implementation of the steps for processing a transaction.

At the intermediate server, the steps implemented in this method for processing a transaction are the following with reference to FIG. 3:

a step for receiving (100) a request for executing a transaction (ReqExecTr);

a step (101) for obtaining (101), on the basis of said request (ReqExecTr), at least one identifier (Id) of said user, at least one identifier of a payment server (idSrvP) and at least one type (typeTr) of said transaction;

a step for searching (102), within a provisioning data structure (StructProv), for an identifier of said user (idP) with the payment server (SrvP);

a step for searching (103), within a delegating data structure (StructDel), for a piece of delegating data (dd) associated with said type (typeTr) of said transaction representing a decision to delegate;

when said piece of delegating data (dd) is positive, a step for implementing (104) said transaction;

when said piece of delegating data (dd) is negative, a step for transmitting (105), to said payment server (SrvP), said type of transaction (typeTr) and said user identifier (idP) with the payment server (SrvP).

The delegating data structure (StructDel) and provisioning data structure (StructProv) are those constituted during the implementation of two phases of the method for delegating explained here above, namely the phases for registering at least one payment server and at least one user with the intermediate server.

In one particular embodiment, when the piece of delegating data is positive, the step (104) for implementing of the transaction by means of the intermediate server includes an additional dialogue between said intermediate server and the payment server comprising the following steps:
- a step for setting up, with the payment server (SrvP) a secured data transmission link;
- a step for transmitting, to the payment server (SrvP), a request for obtaining a piece of bank data, said request comprising said identifier (IdP) of said user with the payment server (SrvP);
- a step for receiving said piece of bank data associated with said user;
- a step for executing said transaction by means of said bank data.

These additional steps make it possible for the intermediate server to obtain, if the type of transaction to be performed requires it, the pieces of complementary data that will enable him to efficiently execute the transaction. This information is not saved by the intermediate server. Thus, even when the intermediate server is compromised, the theft of data present in this intermediate server will not enable the transaction to be carried out.

In another particular embodiment, when the piece of delegating data is negative, the method for processing a transaction furthermore comprises a step for receiving a status of implementation of a non-delegated type of transaction. This status enables the intermediate server to know the current state of a transaction performed by the payment server. By way of non-exhaustive examples, the following states can be envisaged: under execution, terminated, cancelled.

In yet another particular embodiment, and whatever the value of the delegating data, the method for processing a transaction includes an additional step for transmitting a status of implementation of the transaction to the user's communications terminal. The goal this time is to inform the user of the current state of a transaction, whether it is done by the intermediate server or by the payment server. Here again, it is possible for example to envisage the following states non-exhaustively: under execution, terminated, cancelled.

In derived embodiments, and in order to reinforce the security of the method, the communications channels between the intermediate server and the communications terminal on the one hand and between the intermediate server and the payment terminal on the other hand are secured. This can be implemented by the use of data encryption protocols, for example SSL or TLS, that ensure a certain degree of confidentiality of the data transmitted. The securing of the communications channel between the intermediate server and the payment server can also for example be ensured by the creation of a virtual private network (VPN) between these two servers. The data travelling from one end of the VPN to the other are encrypted by means of a tunneling protocol, for example SSL or TLS, and are therefore inaccessible to any person external to the VPN.

5.4 Devices for Implementing Aspects of Disclosure

Figure 4:
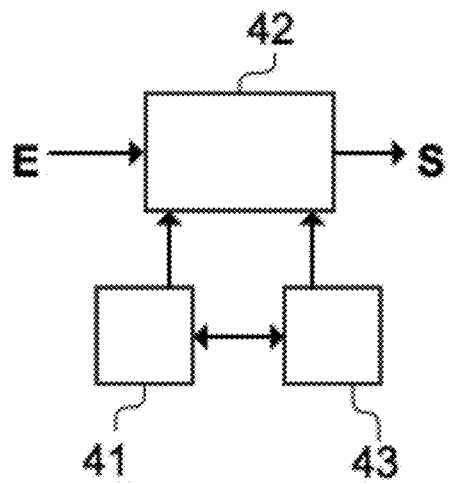
FIG. 4 illustrates a device for delegating the implementing of transactions according to the proposed technique.

Referring to FIG. 4, we describe an intermediate server (SrvInt) comprising means for executing the above-described method for delegating transactions. Thus, such a server comprises:
- means for registering at least one payment server (SrvP) with said intermediate server (SrvInt), said means delivering, within said intermediate server (SrvInt), a delegating data structure (StructDel) comprising at least one association between said payment server (SrvP) and at least one list of types of transactions delegated (LTDe) by said payment server (SrvP) to said intermediate server; and
- means for registering at least one user (Usr) with said intermediate server (SrvInt), said means delivering, within said intermediate server (SrvInt), a provisioning data structure (StructProv) comprising at least one association between a user identifier (id), a payment server identifier (idSrvP) and a user identifier (idP) with said payment server (SrvP).

For example, the intermediate server comprises a memory 41 constituted by a buffer memory, a processing unit 42, equipped for example with a microprocessor and driven by the computer program 43 implementing the method for delegating according to an exemplary embodiment.

At initialization, the code instructions of the computer program 43 are for example loaded into a memory and then executed by the processor of the processing unit 42. The processing unit 42 inputs (E) for example data for identifying a payment server and/or data for identifying a user and/or data representing types of transactions and associated delegations. The microprocessor of the processing unit 42 carries out the steps of the method for delegating the implementing of the transactions, according to the instructions of the computer program 43 to record associations between the payment servers and lists of the delegated transactions on the one hand and associations between user identifiers, payment server identifiers and user identifiers with these payment servers on the other hand and notify the success or failure of these recordings at output (S).

To this end, the intermediate server comprises, in addition to the buffer memory 41, means for the transmission/reception of data that can be made concrete in the form of a connection interface for connection to one or more communications networks, these means making it possible if necessary to set up a secured point-to-point link with a server of a payment services provider. These may be software interfaces or hardware interfaces (such as a network card or network communications hardware modules). According to an exemplary embodiment, such an intermediate server furthermore comprises means of storage which may take the form of a database or an access to such storage means. These storage means comprise delegation and provisioning structures.

Figure 5:
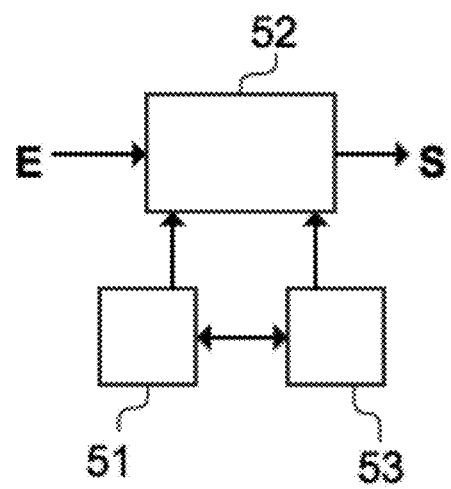
FIG. 5 illustrates a device for processing transactions delegated according to the proposed technique.

Besides, referring to FIG. 5, we describe a server for processing a transaction coming from a communications terminal (TC) of a user comprising means for executing the method for processing the transactions described here above. Thus, such a processing server comprises:
- means for receiving a request for executing a transaction (ReqExecTr);
- means for obtaining, from said request, (ReqExecTr) at least one identifier of said user (id), at least one identifier of a payment server (idSrvP), and at least one type (typeTr) of said transaction;

means for searching, within a provisioning data structure (StructProv) for an identifier of said user (idP) with the payment server (SrvP);

means for searching, within a delegating data structure (StructDel), for an associated piece of delegating data, associated with said type (typeTr) of said structure, delivering a decision to delegate (dd);

when said decision to delegate (dd) is positive, means for implementing said transaction;

when said decision to delegate (dd) is negative, means for transmitting, to said payment server (SrvP), said type of transaction (typeTr) and said user identifier (idP) with the payment server (SrvP).

For example, the server for processing a transaction comprises a memory 51 constituted by a buffer memory, a processing unit 52, equipped for example with a microprocessor and driven by the computer program 53 implementing the method for delegating according to an exemplary embodiment.

At initialization, the code instructions of the computer program 53 are for example loaded into a memory and then executed by the processor of the processing unit 52. The processing unit 52 inputs (E) for example data for identifying a payment server and/or data for identifying a user and/or data representing a type of transaction. The microprocessor of the processing unit 52 carries out the steps of the method for processing transactions, according to the instructions of the computer program 53 to implement the transaction or to relay it to the payment server depending on whether it is of the delegated or non-delegated type, and notify the success or failure of this action for implementing or transmitting at output (S).

To this end, the intermediate server comprises, in addition to the buffer memory 51, means for transmitting/receiving data that can take the form of a connection interface for connection to one or more communications networks, these means making it possible if necessary to set up a secured point-to-point link with a user's communications terminal and/or a server of a payment services provider. These may be software interfaces or hardware interfaces (such as a network card or network communications hardware modules). According to an exemplary embodiment, such a processing server furthermore comprises means of storage which may take the form of a database or an access to such storage means. These storage means comprise delegation and provisioning structures.

Although the present disclosure has been described with reference to one or more examples, workers skilled in the art will recognize that changes may be made in form and detail without departing from the scope of the disclosure and/or the appended claims.

The invention claimed is:

1. A method for processing a transaction, the method being implemented by an intermediate server connected to a user's communications terminal and to a payment server, wherein the method comprises:
receiving by the intermediate server a request for executing a transaction coming from said user's communications terminal;
obtaining by the intermediate server, from said request for executing a transaction, an identifier of said user, an identifier of said payment server and a type of said transaction;
searching by the intermediate server, within a provisioning data structure, for an identifier of said user with the payment server;
searching by the intermediate server, within a delegating data structure, for a piece of delegating data associated with said type of said transaction, delivering a decision to delegate;
when said decision to delegate is positive, implementing said transaction by the intermediate server, the implementing comprising:
setting up a secured link with the payment server;
transmitting, via said secured link, to the payment server, a request for a piece of bank data associated with said user, said request for the piece of bank data comprising said identifier of said user with said payment server;
receiving, via said secured link, from the payment server, said piece of bank data associated with said user; and
executing, said transaction using said piece of bank data associated with said user; and
when said decision to delegate is negative, transmitting by the intermediate server said type of transaction and said identifier of said user with said payment server to said payment server.

2. The method according to claim 1, wherein the method further comprises, before receiving the request for executing the transaction:
during a first phase, registering said payment server with said intermediate server, delivering, within said intermediate server, said delegating data structure comprising at least one association between said payment server and a list of types of delegated transactions delegated by said payment server to said intermediate server; and
during a second phase, registering said user with said intermediate server, delivering, within said intermediate server, said provisioning data structure comprising at least one association between said identifier of said user, said identifier of said payment server and said identifier of said user with said payment server.

3. The method according to claim 2, wherein said first phase further comprises:
transmitting a request to said payment server for delegating types of transactions, said request to said payment server for delegating types of transactions comprising a list of types of delegatable transactions, which the intermediate server can implement on behalf of said payment server;
receiving a piece of data representing a decision of subscription by the payment server to at least one type of transaction of the list of types of delegatable transactions, called the list of types of delegated transactions;
recording, within said delegating data structure, the association between said list of types of delegated transactions and the payment server.

4. The method according to claim 2 wherein said first phase further comprises:
receiving a list of types of transactions implemented by the payment server called a list of types of non-delegated transactions;
recording, within the delegating data structure, an association between said list of types of non-delegated transactions and the payment server.

5. The method according to claim 2, wherein said second phase further comprises:
receiving a registration request by said user, coming from the user's communications terminal, said registration request comprising the identifier of said user, the identifier of the payment server and the identifier of said user with said payment server;

transmitting said identifier of said user with said payment server to said payment server;

receiving a piece of data representing a decision to register said user; and when said data representing a decision to register the user is positive, recording, within said provisioning data structure, the association between said identifier of said user, said identifier of said payment server and said identifier of said user with said payment server.

6. The method according to claim 5 wherein said second phase furthermore comprises:

transmitting a request to delegate types of transactions to said user's communications terminal, said request to delegate types of transactions to said user's communications terminal comprising a list of types of delegatable transactions, that the intermediate server can implement;

receiving, from said user's communications terminal, a piece of data representing a decision of subscription by said user to at least one type of transaction of the list of types of delegatable transactions, called a list of types of delegated transactions by said user;

recording, within the delegating data structure, an association between said list of types of delegated transactions by said user and said user.

7. The method according to claim 1, further comprising, when said decision to delegate is negative, receiving a status of implementation of said transaction, coming from the payment server.

8. The method according to claim 7, further comprising transmitting the status of implementation of said transaction to said user's communications terminal.

9. An intermediate server for processing a transaction coming from a user's communications terminal, wherein the intermediate server comprises:

an input/output configured to connect to a user's communications terminal and to a payment server;

a processor; and a non-transitory computer-readable medium comprising instructions stored thereon, which when executed by the processor configure the intermediate server to perform acts comprising:

receiving a request for executing a transaction coming from said user's communications terminal;

obtaining, from said request for executing a transaction an identifier of said user, an identifier of a payment server and a type of said transaction;

searching, within a provisioning data structure, for an identifier of said user with the payment server;

searching, within a delegating data structure, for a piece of delegating data associated with said type of said transaction, said means delivering a decision to delegate;

when said decision to delegate is positive, implementing said transaction by the intermediate server, the implementing comprising:

setting up a secured link with the payment server;

transmitting, via said secured link, to the payment server, a request for a piece of bank data associated with said user, said request for a piece of bank data comprising said identifier of said user with said payment server;

receiving, via said secured link, from the payment server, said piece of bank data associated with said user;

executing, said transaction using said piece of bank data associated with said user;

when said decision to delegate is negative, transmitting said type of transaction and said identifier of said user with said payment server to said payment server.

10. A non-transitory computer-readable medium comprising a computer program product recorded thereon, which comprises program code instructions executing a method for processing a transaction coming from a user's communications terminal, when the instructions are executed on a processor of an intermediate server, the intermediate server being connected to the user's communications terminal and to a payment server, wherein the instructions comprise instructions that configure the server to:

receive a request for executing a transaction coming from said user's communications terminal;

obtain, from said request for executing a transaction an identifier of said user, an identifier of a payment server and a type of said transaction;

search, within a provisioning data structure, for an identifier of said user with the payment server;

search, within a delegating data structure, for a piece of delegating data associated with said type of said transaction, delivering a decision to delegate;

when said decision to delegate is positive, implement said transaction, comprising:

setting up a secured link with the payment server;

transmitting, via said secured link, to the payment server, a request for a piece of bank data associated with said user, said request for a piece of bank data comprising said identifier of said user with said payment server;

receiving, via said secured link, from the payment server, said piece of bank data associated with said user;

executing, said transaction using said piece of bank data associated with said user;

when said decision to delegate is negative, transmit said type of transaction and said identifier of said user with said payment server to said payment server.

* * * * *